April 29, 1941.                C. C. FAIRBANK                2,240,181
                                 SCUFF PLATE
                             Filed Nov. 22, 1937
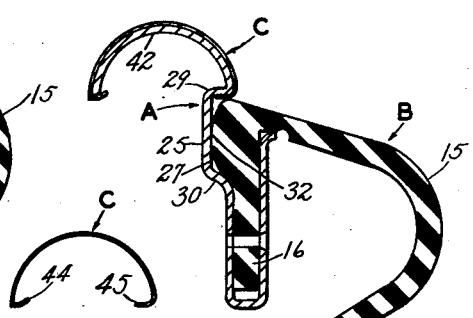
FIG.-3    FIG.-4    FIG.-5    FIG.-6
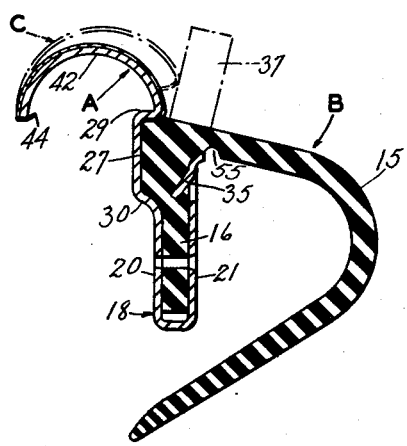
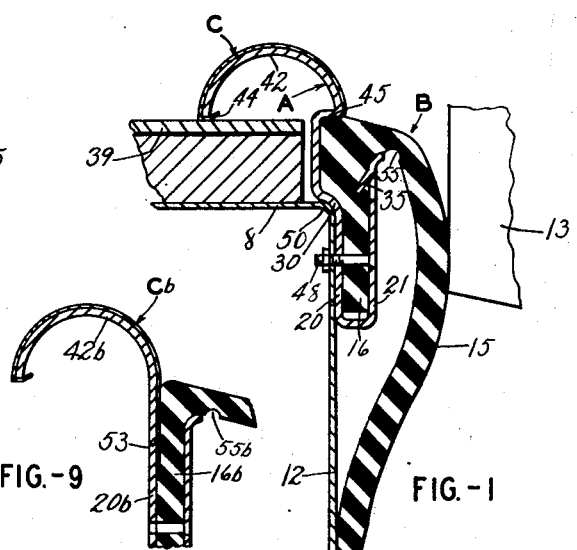
FIG.-7    FIG.-9    FIG.-1
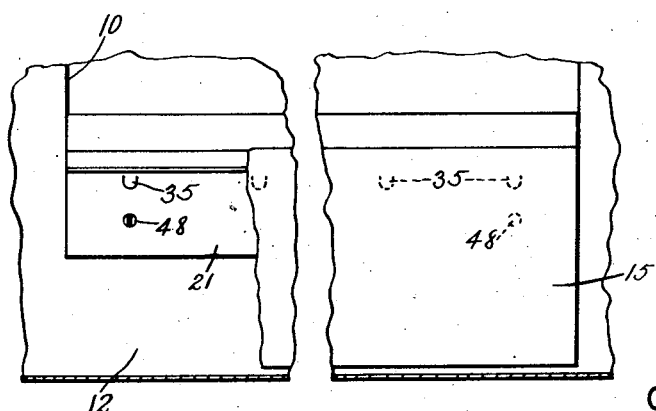
FIG.-8
FIG.-2
INVENTOR
CLARENCE C. FAIRBANK
BY
Brockett, Hyde, Higley & Meyer
ATTORNEYS Patented Apr. 29, 1941

2,240,181

UNITED STATES PATENT OFFICE 2,240,181

SCUFF PLATE

Clarence C. Fairbank, Detroit, Mich., assignor to The Standard Products Company, Cleveland, Ohio, a corporation of Ohio Application November 22, 1937, Serial No. 175,745

4 Claims. (Cl. 296—28)

This invention relates to a scuff plate and more particularly, to a scuff plate especially adapted for use with an automobile, below a door opening thereof, to prevent the vertically disposed floor sill outer face below such door opening from being scuffed or marred by the shoes of persons entering such automobile through said door opening.

The general object of the present invention is the provision of a novel scuff plate which is of simple and inexpensive construction so that it can be made and sold at low cost; which is of strong and durable character so that it has an exceptionally long life in service; and which is of neat and pleasing design so that it enhances, rather than detracts from, the appearance of the automobile with which it is used.

A more specific object of the present invention is the provision of a novel scuff plate which not only protects the floor sill outer face of an automobile, below a door opening thereof, from being scuffed or marred but which also provides an effective seal for the bottom of such door opening when the door therefor is in closed position, thereby making it unnecessary to provide such door with a sealing strip along its bottom edge.

Another specific object of the present invention is the provision of a novel scuff plate which is of such construction that when it is secured to the floor sill of an automobile, below a door opening thereof, the bolts or the like which effect such securement are not solely depended upon for the maintenance of such securement, as the present scuff plate includes a rigid shoulder or abutment for seating engagement upon the upper outside corner portion of said floor sill, the effect of which is to materially aid said bolts or the like in securely maintaining the scuff plate in proper position.

Another specific object of the present invention is the provision of a novel scuff plate which includes a suitable molding or binding for a side edge portion of the floor covering or floor mat of the automobile with which the scuff plate is used, the inclusion of such a molding or binding in the present scuff plate not only enabling such side edge portion of said floor covering or floor mat to be covered and thereby protected from the wear which quickly renders it unsightly in appearance but also, enabling the floor covering or floor mat to be readily maintained in flat form and in proper position.

Another specific object of the present invention is the provision of a novel scuff plate in which the molding or binding thereof includes an ornamental finishing strip of stainless steel or the like and a rigid underlying support therefor, the attachment of said ornamental finishing strip to its underlying support preferably being of snap-on character, so that the scuff plate, without the ornamental finishing strip thereof, may first be secured to an automobile, below a door opening thereof, and the ornamental finishing strip of the scuff plate thereafter quickly attached to its underlying support, with the consequent protection of such finishing strip against scratching or marring during such scuff plate securement, etc.

Another specific object of the present invention is the provision of a novel scuff plate which includes a one-piece molded rubber member having an anchoring flange for rigid securement to a floor sill of an automobile, below a door opening thereof, and a yieldable wing for not only protecting the outer face of said floor sill below such door opening from being scuffed or marred but also, for sealing the bottom of such door opening when the door therefor is in closed position.

Another specific object of the present invention is the provision of a novel scuff plate which includes a rigid metal member having a channel-shaped holder for the anchoring flange of the molded rubber member and also having a laterally extending top portion which constitutes the underlying support for the ornamental finishing strip and which, with said finishing strip, form the folding or binding of the present scuff plate.

Another specific object of the present invention is the provision of a novel scuff plate in which the anchoring flange of the molded rubber member and the channel-shaped holder of the rigid metal member are laterally interlocked at their upper edges, the effect of which is to prevent the upper edge portion of said anchoring flange from pulling outwardly away from the upper edge portion of the metal holder and hence prevent the production of an unsightly and objectionable crack or crevice therebetween.

Further objects of the present invention, and further features thereof, are in part obvious and in part will appear more in detail hereinafter.

The present invention will be readily understood from the following description of three embodiments thereof, reference being had to the accompanying drawing, in which Fig. 1 is a vertical or cross-sectional view of a scuff plate embodying the present invention, said scuff plate being secured to the floor sill of an automobile below a door opening thereof, the door for such opening being in closed position; Fig. 2 is a side view thereof from outside the automobile, the automobile door having been omitted and a part of the protecting and sealing wing of the scuff plate having been broken away; Fig. 3 is a vertical or cross-sectional view of the rigid metal member of the scuff plate; Fig. 4 is a similar view of the molded rubber thereof; Fig. 5 is a similar view of the ornamental finishing strip of the molding or binding of the scuff plate; Fig. 6 is a vertical or cross-sectional view of the rigid metal member of the scuff plate and the molded rubber member thereof as assembled initially; Fig. 7 is a similar view of the scuff plate in its final form, a partially attached position of the ornamental finishing strip of the scuff plate being also shown in dotted lines; and Figs. 8 and 9 are vertical or cross-sectional fragmentary views of modified forms of scuff plates which also embody the present invention.

Before the present invention is described in detail, it is to be understood that such invention is not limited to the details of construction and/or the specific arrangement of parts herein illustrated and/or described, as the invention may obviously take other forms. It also is to be understood that the phraseology or terminology herein employed is for the purpose of description and not of limitation, there being no intention and no desire to limit the present invention, as herein disclosed and as defined in the appended claims, beyond the requirements of the prior art.

Referring first to that embodiment of the invention illustrated in Figs. 1 to 7 inclusive, it will be noted that the scuff plate constituting such embodiment comprises three simple and inexpensive members, namely, a rigid member A of cold rolled steel or other suitable material and individually illustrated in Fig. 3, a yieldable member B of molded rubber or other suitable yieldable material and individually illustrated in Fig. 4, and an ornamental finishing strip C of stainless steel or other suitable material and individually illustrated in Fig. 5. As shown in Fig. 2, in which said scuff plate is secured to the floor sill 8 of an automobile, below a door opening 10 thereof, the three members comprising such scuff plate are of equal width, the width thereof corresponding to the width of the automobile door opening 10 below which the scuff plate is secured.

To protect that portion of the vertically disposed floor sill outer face 12 which lies below the door opening 10 from being scuffed or marred by the shoes of persons entering the automobile through such door opening 10, and to provide a seal for the bottom of said door opening when the door 13 therefor is in closed position, as in Fig. 1, the molded rubber member B includes a yieldable and flexible wing 15 which effectively performs those two functions.

As clearly shown in Fig. 1, said wing 15 is of such depth that it overlaps, and thereby effectively protects, substantially the entire area of the floor sill outer face 12 which lies below the door opening 10, and is of such lateral extent, being here shown as of outwardly arched or bowed form, that it yieldingly but firmly engages the bottom portion of the door 13 whenever such door is in closed position, with the consequent effective sealing at such times of the bottom of the door opening 10. With the use, therefore, below a door opening of an automobile or the like, of a scuff plate embodying the present invention, it is unnecessary to secure to the bottom portion of the door for such opening a sealing strip of one kind or another, as is now necessary if the bottom of such door opening is to be sealed.

To enable the wing 15 of the molded rubber member B to be mounted in proper position relative to that portion of the floor sill outer face 12 which lies below the door opening 10 and relative to the bottom portion of the door 13 for such opening, for the protection of said floor sill outer face portion and for cooperation with such door in sealing the bottom of the door opening 10, the molded rubber member B also includes a suitable anchoring flange 16, for securement to the automobile floor sill 8 alongside its outer face 12, as will hereinafter more fully appear. As here shown, the anchoring flange 16 is integral with and depends from the upper edge of the wing 15, said flange being of such depth that its lower or bottom edge terminates some distance above the lower portion of said wing. As best shown in Figs. 4, 6 and 7, the molded rubber member B is so formed that the lower portion of its wing 15 normally tends to project inwardly beyond the general vertical plane of its anchoring flange 16, the effect of which is to cause the lower edge of said wing to yieldingly but firmly engage the floor sill outer face 12 in the use of the scuff plate, as best shown in Fig. 1.

For the reception of the anchoring flange 16 of the molded rubber member B, to enable its securement to the floor sill 8 to be of more rigid and more durable character, the rigid metal member A includes a generally channel-shaped holder 18, open at its upper end and having its inner side wall 20 of greater depth than its outer side wall 21, to correspond to the variation in depth of the inner and outer side wall surfaces 22, 23 of the anchoring flange 16 which such holder is adapted to receive.

When the automobile door 13 strikes the outwardly arched or bowed yieldable and flexible wing 15, upon the movement of said door to closed position, said wing flattens out somewhat and in so doing, tends to pull the top edge of the anchoring flange 16 connected therewith outwardly from the top edge of the inner wall 20 of the channel-shaped metal holder 18, with the consequent tendency to produce therebetween, or the actual production thereof, an unsightly and otherwise objectionable crack or crevice. In the scuff plate of Figs. 1 to 7 inclusive, simple and inexpensive means is included for effectively maintaining at all times the top edge of the anchoring flange of said scuff plate in close or firm contact with the top edge of the holder inner wall thereof, to thereby prevent the formation therebetween of such a crack or crevice.

As clearly shown in Figs. 1 to 7 inclusive of the accompanying drawing, the upper edge portion of the holder inner side wall 20 is inwardly offset, as at 25, throughout its entire width, the effect of which is to provide, in said inner side wall, a correspondingly offset cavity 27 and two shoulders or abutments 29, 30, the shoulder or abutment 29 forming the top wall of said cavity and the top edge of the holder inner wall 20 and the shoulder or abutment 30, located substantially midway of the top and bottom edges of said holder inner side wall, forming the bottom wall of such cavity. Extending inwardly along the top edge portion of the inner side wall surface 22 of the anchoring rubber flange 16 is a ridge or bead 32, having an arcuate exterior surface and being simply and inexpensively formed by making the upper edge portion of said anchoring flange of increased thickness.

When the anchoring flange 16 is inserted within, and thereby initially assembled with, the channel-shaped metal holder 18, the ridge or bead 32 of said anchoring flange lies within the cavity 27 of said holder, but as clearly shown in Fig. 6, the normal cross-sectional shape and the normal cross-sectional size of said ridge or bead are such that said holder cavity is not completely filled by the rubber forming said ridge or bead. In order to completely and forcibly fill or pack the holder cavity 27 with the rubber of the anchoring flange 16, to thereby effectively secure and maintain the upper edge portion of said anchoring flange in interlocked relationship with the upper edge portion of the holder inner wall 20, a series of tongues 35, in the scuff plate illustrated in Figs. 1 to 7 inclusive, are struck from the upper edge portion of the holder outer wall 21 and forcibly pressed inwardly into the body of rubber of the upper edge portion of the anchoring flange 16. As a result, the holder cavity 27 is completely filled or packed with compressed rubber of the anchoring flange 16, the rubber in said cavity being in particularly forceful contact with the shoulder or abutment 29 which forms the top wall of said cavity and the top edge of the holder inner side wall 20. There is no liability whatsoever, therefore, of the top edge of the anchoring flange 16 pulling outwardly away from said shoulder or abutment 29 with the consequent production therebetween of an unsightly crack or crevice, the arcuate form of the exterior surface of the ridge or bead 32 of the anchoring flange 16 being an important contributing factor in the accomplishment of that result, as will be readily understood. To facilitate the packing of the rubber of the anchoring flange 16 within the holder cavity 27 while the tongues 35 are being forcibly pressed inwardly into the body of rubber of said anchoring flange, a suitable abutment tool 37 may be applied to the upper edge portion of the flexible protecting and sealing wing 15, as indicated in dotted lines, Fig. 7.

As indicated in the accompanying drawing, the scuff plate of Figs. 1 to 7 inclusive also includes a suitable molding or binding for that side edge portion of the automobile floor covering or floor mat 39 which lies along the bottom of the door opening 10. The molding or binding for such purpose of the scuff plate here shown comprises the ornamental finishing strip C heretofore referred to and an underlying support 42 therefor, said underlying support extending inwardly from, and being integral with or otherwise suitably connected to, the shoulder or abutment 29 at the upper edge of the holder inner side wall 20 of the rigid metal member A. To give it increased strength and increased rigidity, said underlying supporting portion 42 may be, and here is, of convex-concave form in cross section.

In order to prevent the ornamental finishing strip C from being scratched or marred during the securement of the present scuff plate to the automobile floor sill 8, or during other work upon the automobile in the manufacture or assembly thereof, the finishing strip C is of such character that it may be snapped over or otherwise quickly and easily applied to its underlying support 42 after the securement of the scuff plate to the automobile floor sill 8 has been effected. As here shown, the side edge portions 44, 45 of the finishing strip C are bent laterally toward each other, the inner bent edge portion 44 thereof being adapted to underlie the inner side edge of the support 42 for said strip and the outer bent edge portion 45 of said finishing strip being adapted to underlie the shoulder or abutment 29 of the holder inner side wall 20, the rubber of the anchoring flange 16 in contact with said shoulder or abutment yielding sufficiently to enable the finishing strip edge portion 45 to be inserted therebetween, as will be readily understood.

In Fig. 7, the finishing strip C is shown in dotted lines in partially applied position to its underlying support 42, the inner bent edge portion 44 of such finishing strip having been hooked around the inner edge of its support 42, and by snapping the outer bent edge portion 45 of said finishing strip under or beneath the holder inner wall shoulder or abutment 29, the assembly of said finishing strip with its underlying support 42 can be easily and quickly effected. the material of which said finishing strip is made having sufficient resiliency to permit such snap-on attachment. As the finishing strip receives its support from its underlying rigid portion 42, with which it corresponds in cross-sectional shape, the material of the finishing strip may be of light gauge character, such as light gauge stainless steel or the like.

The securement to the automobile floor sill 8 of the scuff plate of Figs. 1 to 7 inclusive is here shown as effected by the use of bolts 48 or the like, the metal holder 18 of said scuff plate and the anchoring rubber flange 16 thereof lying alongside that portion of the floor sill outer face 12 which is below the door opening 10. As shown in Fig. 1, the scuff plate is so secured to said floor sill that the shoulder or abutment 30 of said scuff plate rests or seats upon the upper outside corner portion 50 of the floor sill, the effect of which is to materially aid the bolts 48 or the like in firmly and securely maintaining the scuff plate in proper position.

The slightly modified form of scuff plate partially illustrated in Fig. 8 differs from the scuff plate illustrated in Figs. 1 to 7 inclusive and heretofore described in that it utilizes a slightly different means for forcibly filling or packing the holder cavity 27a with compressed rubber of the anchoring flange 16a.

In the scuff plate of Fig. 8, the upper edge 52 of the rigid holder outer side wall 21a is not bent outwardly, as is the upper edge of the holder outer side wall 21 of the scuff plate of Figs. 1 to 7 inclusive, but is bent inwardly, into the body of rubber of the upper edge portion of the anchoring flange 16a, the effect thereof being to completely fill or pack the holder cavity 27a with compressed rubber of said anchoring flange. With the scuff plate of Fig. 8, therefore, as with the scuff plate of Figs. 1 to 7 inclusive, there is no liability of the top edge of the anchoring flange 16a pulling outwardly away from the upper shoulder or abutment 29a of the inwardly offset portion of the holder inner side wall 20a, with the production therebetween of an unsightly and otherwise objectionable crack or crevice.

In the scuff plate partially illustrated in Fig. 9, the upper edge portion of the holder inner wall 20b is not inwardly offset, as are the corresponding portions of the scuff plates of Figs. 1 to 7 inclusive and Fig. 8, so that in the scuff plate of Fig. 9, there is no shoulder or abutment beneath or below which may be snapped and thereby retained the outer side edge portion of the ornamental finishing strip Cb. In the scuff plate of Fig. 9, therefore, the outer side edge portion of the finishing strip Cb extends downwardly between the upper edge portion of the holder inner wall 20b and the contiguous upper edge portion of the anchoring rubber flange 16b. If desired and as here shown, the outer side edge portion of the finishing strip Cb of the scuff plate of Fig. 9 may be welded, as at 53, to the upper edge portion of the holder inner wall 20b, the effect of which is to permanently secure said finishing strip to its underlying rigid support 42b.

In order to increase the flexibility of the protecting and sealing wing of a scuff plate embodying the present invention, such wing may be provided in the inner surface of the upper edge portion thereof, as here shown, with a suitable groove 55, extending the full width thereof and which permits the wing to bend or flex therealong, as will be readily understood.

Other features and advantages of the present invention will be apparent, of course, to those skilled in the art to which it relates.

What I claim is:

1. A scuff plate for the floor sill of an automobile or the like below a door opening thereof, with said floor sill having a generally vertical outer face and a generally horizontal top face, said scuff plate comprising a rigid channel member open at its top and adapted to be secured to said floor sill, with the inner side wall of said channel member alongside the outer face of said floor sill, said channel member when so secured to said floor sill having the top opening of its generally vertical channel adjacent the top face of said floor sill, and a resilient member having an anchoring portion secured in the channel of said channel member and also having a depending wing portion which terminates adjacent the lower longitudinal edge portion of the outer side face of said floor sill, said wing portion being adapted for resilient sealing engagement with the bottom edge portion of the door for said door opening, the inner wall of said channel member being provided with an inwardly offset recess within which is confined a part of the anchoring portion of said resilient member, the generally horizontal part of the channel member inner wall which constitutes the inwardly extending bottom wall of said recess having seating engagement upon said floor sill top face.

2. A scuff plate for the floor sill of an automobile or the like below a door opening thereof, with said floor sill having a generally vertical outer face and a generally horizontal top face, said scuff plate comprising a rigid channel member open at its top and adapted to be secured to said floor sill, with the inner side wall of said channel member alongside the outer face of said floor sill, said channel member when so secured to said floor sill having the top opening of its generally vertical channel adjacent the top face of said floor sill, and a resilient member having an anchoring portion secured in the channel of said channel member and also having a depending wing portion which terminates adjacent the lower longitudinal edge portion of the outer side face of said floor sill, said wing portion being adapted for resilient sealing engagement with the bottom edge portion of the door for said door opening, the inner wall of said channel member being provided with an inwardly offset recess within which is confined the upper longitudinal edge part of the anchoring portion of said resilient member, the generally horizontal part of the channel member inner wall which constitutes the bottom wall of said recess having seating engagement upon said floor sill top face and the generally horizontal part of the channel member inner wall which constitutes the top wall of said recess having confining engagement with the top surface of the anchoring portion of said resilient member.

3. A scuff plate for the floor sill of an automobile or the like below a door opening thereof, with said floor sill having a generally vertical outer face and a generally horizontal top face, said scuff plate comprising a rigid channel member open at its top and adapted to be secured to said floor sill, with the inner side wall of said channel member alongside the outer face of said floor sill, said channel member when so secured to said floor sill having the top opening of its generally vertical channel adjacent the top face of said floor sill, and a resilient rubber-like member having an anchoring portion secured in the channel of said channel member and also having a depending wing portion of outwardly bowed form which terminates adjacent the lower longitudinal edge portion of the outer side face of said floor sill, said wing portion being adapted for resilient sealing engagement with the bottom edge portion of the door for said door opening, the inner wall of said channel member being provided with an inwardly offset recess into which extends a part of the anchoring portion of said resilient rubber-like member, the outer side wall of said channel member being provided with inwardly extending means for confining the aforesaid part of said anchoring portion within said recess and in engagement with those parts of the channel member inner wall which constitute the top and bottom walls of said recess, the bottom wall of said recess having seating engagement upon the top face of said floor sill.

4. In combination with a floor sill located below the door opening of an automobile or the like and having a generally vertical outer face and a generally horizontal partially covered top face, the outer longitudinal edge portion of said floor sill top face being uncovered, a scuff plate comprising a rigid channel member open at its top and adapted to be secured to said floor sill, with the inner side wall of said channel member alongside the outer face of said floor sill, said channel member when so secured to said floor sill having the top opening of its generally vertical channel adjacent the top face of said floor sill, the inner wall of said channel member having an inwardly extending shoulder for seating engagement upon the uncovered portion of said floor sill top face and also having an inwardly extending top flange for seating engagement upon the covering for said floor sill top face, and a resilient member having an anchoring portion secured in the channel of said channel member and also having a depending wing portion which terminates adjacent the lower longitudinal edge portion of the outer side face of said floor sill, said wing portion being adapted for resilient sealing engagement with the bottom edge portion of the door for said door opening.

CLARENCE C. FAIRBANK.